US010438089B2

United States Patent
Porter et al.

(10) Patent No.: US 10,438,089 B2
(45) Date of Patent: Oct. 8, 2019

(54) LOGO DETECTION VIDEO ANALYTICS

(71) Applicant: ORGANIZATIONAL STRATEGIES INTERNATIONAL PTE. LTD., Singapore (SG)

(72) Inventors: Jason Porter, Berryville, VA (US); Michael Michael, Singapore (SG); Ye Chuanhun, Singapore (SG); Johannes Sujendro, Singapore (SG); Foo Yong Yan, Singapore (SG)

(73) Assignee: HENDRICKS CORP. PTE. LTD., Singapore (SG)

( * ) Notice: Subject to any disclaimer, the term of this patent is extended or adjusted under 35 U.S.C. 154(b) by 415 days.

(21) Appl. No.: 15/403,482

(22) Filed: Jan. 11, 2017

(65) Prior Publication Data

US 2018/0197042 A1 Jul. 12, 2018

(51) Int. Cl.
- *G06K 9/62* (2006.01)
- *G06K 9/46* (2006.01)
- *G06K 9/42* (2006.01)
- *G06K 9/00* (2006.01)

(52) U.S. Cl.
CPC ....... *G06K 9/6202* (2013.01); *G06K 9/00744* (2013.01); *G06K 9/42* (2013.01); *G06K 9/4604* (2013.01); *G06K 9/4652* (2013.01); *G06K 2209/25* (2013.01)

(58) Field of Classification Search
CPC .................. G06K 9/00–82; G06K 2209/25
See application file for complete search history.

(56) References Cited

U.S. PATENT DOCUMENTS

| | | | | |
|---|---|---|---|---|
| 8,958,605 B2* | 2/2015 | Amtrup | ............. | G06K 9/00469 382/112 |
| 2004/0125877 A1* | 7/2004 | Chang | ............... | G06K 9/00335 375/240.28 |
| 2006/0120607 A1* | 6/2006 | Lev | .................... | G06K 9/00624 382/217 |
| 2006/0182311 A1* | 8/2006 | Lev | ........................ | G06K 9/325 382/103 |
| 2007/0014467 A1* | 1/2007 | Bryll | .................... | G06K 9/4609 382/152 |
| 2009/0263025 A1* | 10/2009 | Li | ......................... | G06K 9/346 382/203 |
| 2012/0113489 A1* | 5/2012 | Heit | ...................... | G06K 9/186 358/518 |
| 2013/0124414 A1* | 5/2013 | Roach | .................... | G06Q 20/10 705/44 |
| 2013/0294697 A1* | 11/2013 | Nepomniachtchi | .. | G06K 9/6211 382/192 |
| 2014/0185933 A1* | 7/2014 | Tian | ................... | G06K 9/00577 382/173 |

(Continued)

*Primary Examiner* — Sean T Motsinger

(74) *Attorney, Agent, or Firm* — Vierra Magen Marcus LLP

(57) ABSTRACT

The technology relates to technology for detecting a predetermined image using a template of the predetermined image. The method includes detecting a color, reducing the color to a range of the color, converting to a grayscale plurality of images, extracting at least one edge of the grayscale images, identifying each component in the images, conducting binarization for the each component, obtaining a threshold value, normalizing the template, and matching the template to the predetermined image.

20 Claims, 9 Drawing Sheets

(56) References Cited

U.S. PATENT DOCUMENTS

| | | | |
|---|---|---|---|
| 2015/0010228 A1* | 1/2015 | Rogers | G06K 9/00536 382/141 |
| 2016/0203388 A1* | 7/2016 | Li | G06T 7/73 386/241 |
| 2017/0140219 A1* | 5/2017 | King | G06K 9/00483 |
| 2017/0187987 A1* | 6/2017 | Mukai | H04N 5/225 |
| 2018/0197042 A1* | 7/2018 | Porter | G06K 9/6202 |

* cited by examiner

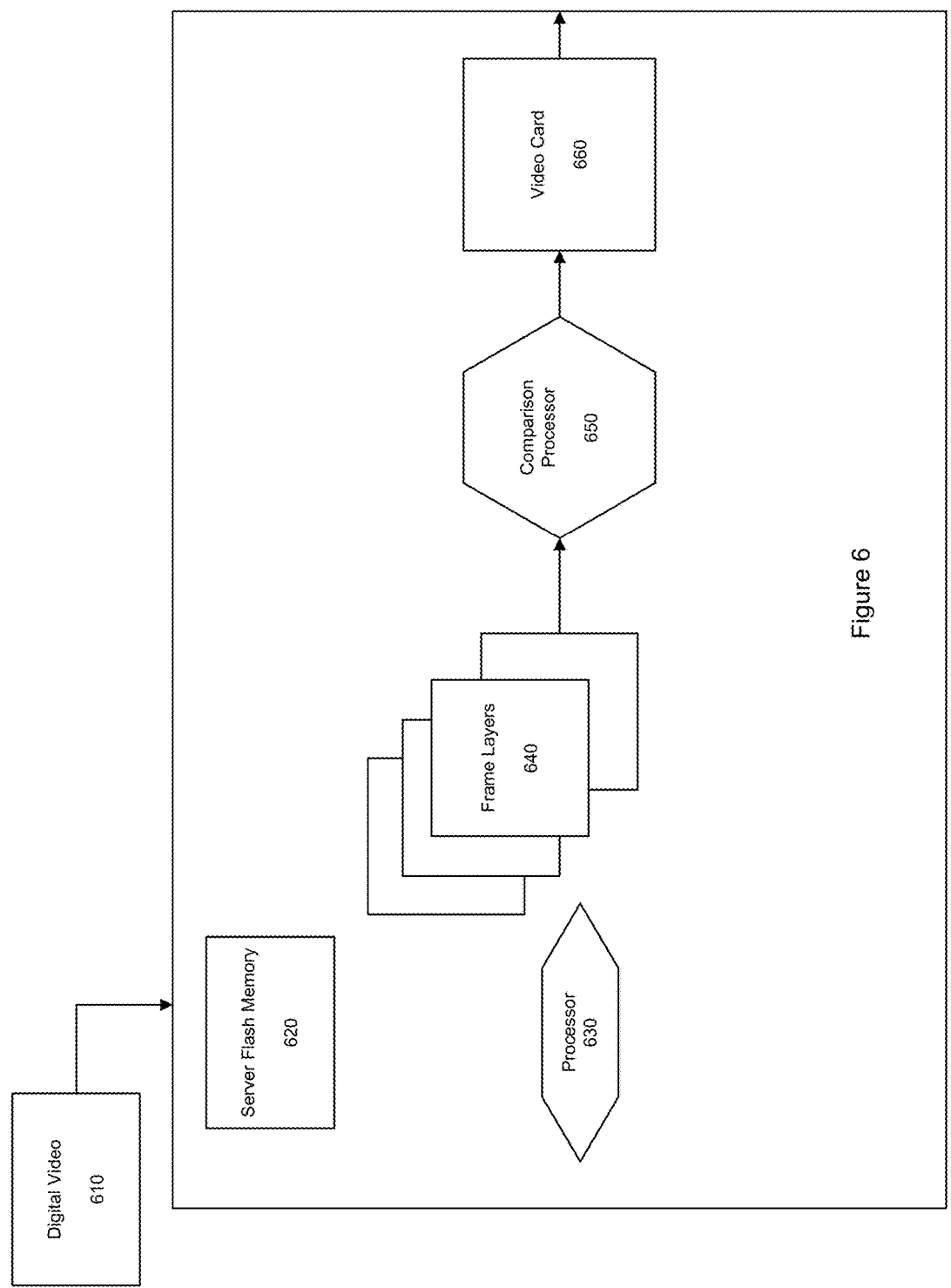

LOGO DETECTION VIDEO ANALYTICS

BACKGROUND

Computer vision is an important and necessary aspect of market research and data analysis today. Many industries seek market researchers to obtain relevant data for brand and logo recognition on television, the internet, and elsewhere. Object recognition is generally an important subject matter but the technology is lacking in comparison to the industry's needs.

SUMMARY

In one embodiment, there is a method for detecting a predetermined image within a plurality of images using a template of the predetermined image. The method includes detecting a color of the plurality of images, reducing the color of the plurality of images to a range of the color, converting the range of color of the plurality of images to a grayscale plurality of images, extracting at least one edge of the grayscale plurality of images, identifying each component in the grayscale plurality of images, conducting binarization for the each component, obtaining a threshold value for the each component, normalizing the template according to a size of the each connected component, and matching the template to the predetermined image using the at least one component in the plurality of images.

In another embodiment, there is an apparatus for detecting a predetermined image within a plurality of images using a template of the predetermined image is disclosed. The apparatus includes a processor and a memory. The apparatus also includes an agent, executable by the processor, configured to determine whether the predetermined image is a text based image, detect color of the plurality of images, reduce the color of the plurality of images to a range of color, convert the range of color of the plurality of images to a grayscale plurality of images, extract at least one edge of the grayscale plurality of images, identify each component in the grayscale plurality of images, conduct binarization for the each component, obtain a threshold value for the each component, normalize the template according to a size of the each component, and match the template to a predetermined image using the at least one component in the plurality of images.

In still another embodiment, there is a computer storage device including one or more processors and a memory having collectively stored therein instructions that, when executed by the processor, cause the processor to determine whether the predetermined image is a text based image, detect color of the plurality of images, reduce the color of the plurality of images to a range of color, convert the range of color of the plurality of images to a grayscale plurality of images, extract at least one edge of the grayscale plurality of images, identify each component in the grayscale plurality of images, conduct binarization for the each component, obtain a threshold value for the each component, normalize the template according to a size of the each component, and match the template to the predetermined image using the at least one connected component in the plurality of images.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter. The claimed subject matter is not limited to implementations that solve any or all disadvantages noted in the Background.

BRIEF DESCRIPTION OF THE DRAWINGS

Aspects of the present technology are illustrated by way of example and are not limited by the accompanying figures for which like references indicate like elements.

FIG. 6 illustrates a block diagram of an apparatus used to find a predetermined image, namely a logo or a brand.

DETAILED DESCRIPTION

The technology relates to object recognition, and more specifically logo and image recognition. Logo recognition, specifically, is a subset of object recognition, as most logos can be considered objects with a planar surface. In addition, logos are designed to catch the attention of the viewer. In general, a logo recognition system should be able to determine if an unknown image contains a specified logo while maintaining a high rate of recognition accuracy, in a fast and efficient manner.

The disclosed logo detection system is implemented using algorithms, amongst other steps, that detect or recognize logos by using various features, such as their shape and color. Compared to logo detection algorithms known in the art, the present technology is advantageous for several reasons. The present technology is able to detect logos with a high degree of accuracy. Further, the present technology uses a small processing time, as well as low memory consumption. Additionally, the present technology uses a logo detection system that can detect logos of different sizes, rotations, formations and illuminations. Further, the present technology is not limited to only recognizing logos. The present technology is also able to recognize images, regardless of shape, size, color, form or any other features of the image.

It is understood that the present subject matter may be embodied in many different forms and should not be construed as being limited to the embodiments set forth herein. Rather, these embodiments are provided so that this subject matter will be thorough and complete and will fully convey the technology to those skilled in the art. Indeed, the subject matter is intended to cover alternatives, modifications and equivalents of these embodiments, which are included within the scope and spirit of the subject matter as defined by the appended claims. Furthermore, in the following detailed description of the present subject matter, numerous specific details are set forth in order to provide a thorough understanding of the present subject matter. However, it will be clear to those of ordinary skill in the art that the present subject matter may be practiced without such specific details.

Figure 1:
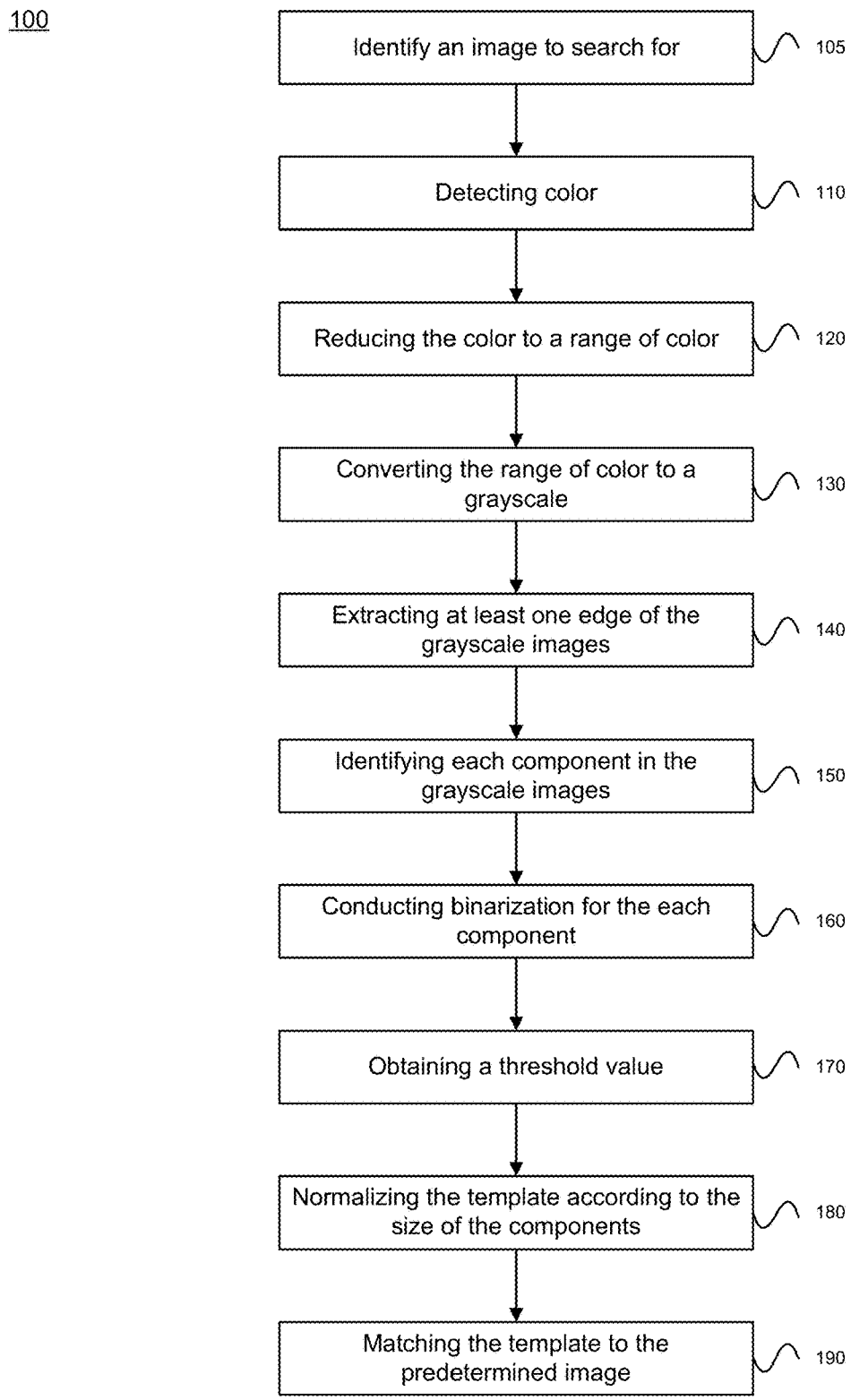
FIG. 1 illustrates a flow diagram of a process of finding a predetermined image, namely a logo or a brand.

FIG. 1 illustrates a flow diagram showing the method of detecting a predetermined image, namely a logo image, from, but not limited to, received images. The process 100 of logo detection can be used to detect a logo within any stream of received images. Received images are not limited to video. Received images can be from a television or streaming on the Internet, like Netflix or Hulu, for example. Further, the images may be from Google Glass or other wearables, along with any still image or a single frame, amongst others. In step 105, a predetermined image to be searched for within the received images, is identified. The predetermined image, in this example, is, but is not limited to, a logo. A database comprising a plurality of images includes the predetermined image. The predetermined image, upon being stored in the database, has been pre-assessed, meaning that all of the colors of the predetermined image are determined. For example, if the CNN Logo is the predetermined image, then the pre-assessment entails that its red color will be noted, identified and stored in the database. This process will try to find any number of logo's predetermined image stored in the database in parallel. The algorithm will detect and recognize multiple logos in one frame and/or image. The steps described herein, determine a method and apparatus for, looking for at least one logo. In step 110, a single frame is analyzed, by first detecting and identifying all of the colors in the frame. At step 120, the range of colors identified in the frame will be reduced to focus on a reduced range of those colors. Each predetermined image has a specific color that can be used as one of the features used to locate the predetermined image from the frame. At step 130, the range of colors will be reduced to a gray scale. The detection, identification and conversion of color to a grayscale can be accomplished by using, but is not limited to using, the following algorithm:

$(x,y)=0.299*R(x,y)+0.587*G(x,y)+0.114*B(x,y)$, where $T(x,y)$ is the gray intensity at the gray image coordinate $(x,y)$, and $R(x,y)$, $G(x,y)$, $B(x,y)$ are the red intensity, green intensity, and blue intensity, respectively, at the color image coordinate $(x,y)$. The coefficients are taken from the weighted R, G and B values to calculate Y, the measure of the overall brightness of one image in the YUV color space, where $Y=0.299R+0.587G+0.114B$. Thus $T(x, y)$ is exactly equivalent to $Y(x, y)$.

Depending on various factors, one channel may be used to get a gray image. The formulas are, $$T(x, y)=R(x, y), \text{ or } T(x, y)=G(x, y), \text{ or } T(x, y)=B(x, y)$$

Converting the colors in the frame to a grayscale provides increased accuracy in image definition and image recognition. Further, grayscale imaging provides more accurate finite shaping. The (x,y) components of the above algorithm vary depending on the location of the image on the screen, such that the (x,y) components serve as grid components.

From the grayscale image formed at step 130, at least one edge of the grayscale image is extracted, at step 140, using a method like, but is not limited to, the Sobel Methodology. FIGS. 2A-2E will be referenced herein to describe steps 130-150 of FIG. 1.

Figure 2A:
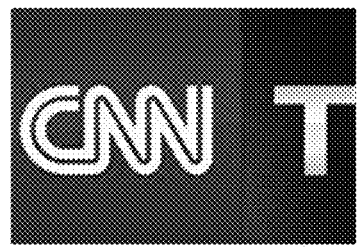
FIGS. 2A-2E illustrate sample images as an image progresses through a process of finding a predetermined image, namely a logo or a brand.
Figure 2B:
Figure 2C:
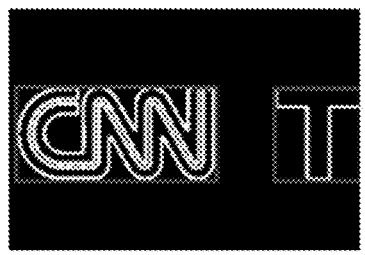
Figure 2D:
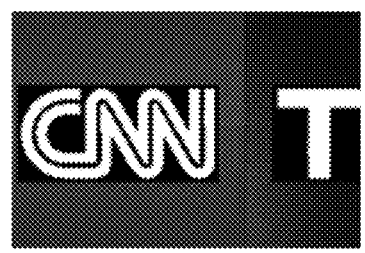
Figure 2E:
Figure 2F:
FIG. 2F illustrates a sample image with connected components.

In FIG. 2A, a sample image, or a sample frame from a video, has been converted to grayscale (grayscale image). In FIG. 2B, all of the edges in the components in the image are white, showing that the edges in the image have been extracted from the image (edge image), as outlined in step 140. In FIG. 2C, each component of the image is outlined with a red box. The 'C', 'N' and 'N' are all components in the first line, and are boxed together. These three components together are called a connected component. Each component (or candidate) and connected component is a blob, when using the Blob Analysis. FIG. 2D is a partially binarized image where only the rectangles including character components (if any) are binarized. FIG. 2E is a complete binary image (from FIG. 2D). A connected component/blob is a group of connected pixels in a binary image. The intensity values of the connected pixels are same to each other. For example, in FIG. 2F, the binary image contains five connected components which are labeled from 1 to 5.

In step 150, the components, or blobs, are identified within the grayscale image. In an initial extraction step of the Blob Analysis, one of the image thresholding techniques is applied to obtain a region corresponding to the objects (or a single object) being inspected. This is used to obtain a separation between the components (or candidates). The extracted region is often flawed by noise of various kinds. For example, the noise could be caused by inconsistent lighting or poor image quality. While refining, the region is enhanced using region transformation techniques. In the analysis, the refined region is subject to measurements and results are computed. If the region represents multiple objects, it is split into individual blobs, or components, each of which is inspected separately.

Figure 3A:
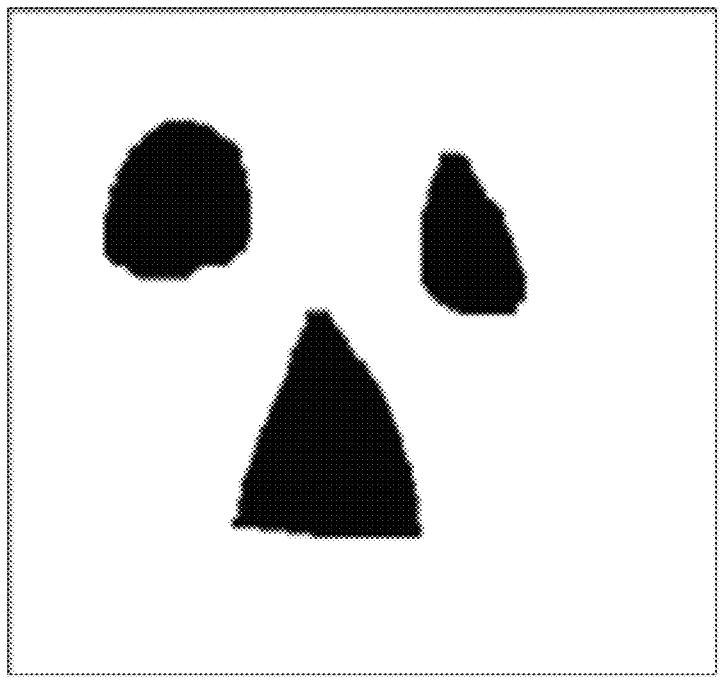
FIGS. 3A and 3B illustrate sample images using a Blob Analysis in a process of finding a predetermined image, namely a logo or a brand.
Figure 3B:
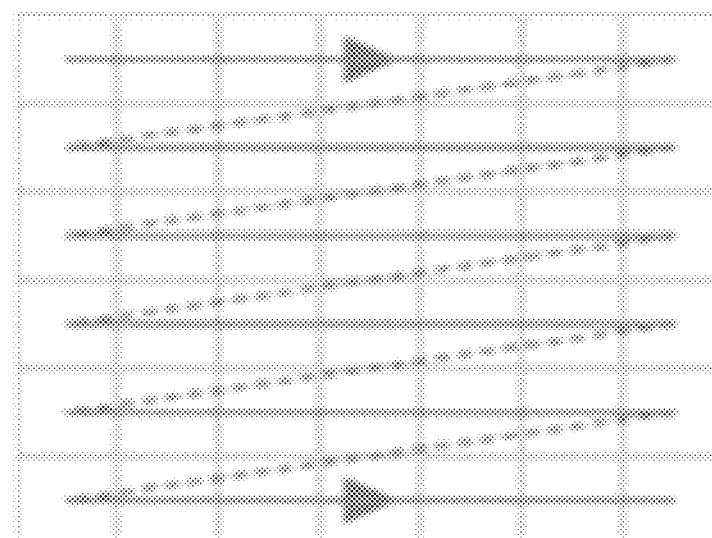

In order to accurately label each blob as one candidate, an algorithm is performed that computes the following:
- Iterate through pixels from the top to the bottom, left to right, until the first object pixel is found, as shown in FIG. 3B.
- Label the object and check whether surrounding or neighboring pixels are equivalent to the object pixel. If they are, take the same step as the first object pixel until more neighbor object pixels can be found.
- Repeat the steps and label all object pixels until all pixels have been scanned.
- Object pixels with the same labels belong to the same blob.
- Once all blobs are labelled, perform an analysis to get area, size, perimeter, amongst other measurements.

Based on the blob results, as shown in FIG. 3A, each blob is a logo candidate. In order to have a more accurate performance and accuracy, filtering and normalizing is done. Based on the parameters of the size of the blob and the template, accordingly, filtering is done to remove all candidates that do not meet the size requirement. In addition to filtering for size, normalization can be done to all of the blobs, or logo candidates. The normalization of the image will be following the size of the template. This will help to achieve high accuracy and perform any template matching algorithm used with the process.

A binary image is an image that has only two possible values for each pixel. The two possible values may be 1, 0, or 255, 0, or any other different values. Image binarization is to convert a gray-scale image to a binary image with a threshold value. Assume $T(x, y)$ and $B(x, y)$ are the gray-scale image and the binary image respectively. TV is the threshold value. The formula used is:

$$B(x, y) = \begin{cases} V1 \text{ if } T(x, y) \geq TV \\ V2 \text{ if } T(x, y) < TV \end{cases}$$

V1, V2 are the two different values mentioned above.

In step 160, each component identified in step 150 is broken down into binary digits, using a method of image binarization. In the method of image binarization, each component is broken down into its corresponding binary numbers. In FIG. 2C, the letter, 'T' is broken down into its respective binary digits. In addition, the letters "CNN' are broken down into binary digits together, not individually. This binary information provides more detailed information to the processor regarding the specifics of the image being searched. As mentioned earlier, in FIG. 2C, components identified with an outline of a red box illustrate examples of blob images (please see explanation above) of the sample image, FIG. 2A, once the components have been identified. Further, at step 160, the image is further broken down into layers. Each frame has up to 1200 colors and each color becomes a layer. The layers are examined in a frame to look for a logo image or a brand image. Further, once the video is split into layers, a single frame is examined to determine whether the frame is high quality or low quality. Each color is determined and assigned a number, for example. In order to get a robust binary image and adjust contrast level automatically, a dynamic binary algorithm is applied to the images.

At step 170, a threshold value is obtained and will apply to another region of the image. Each component in each frame or image has its own threshold value. The threshold value is stored in the RAM of a computer processing the method. In one example, the Otsu Algorithm is used to obtain a threshold value for each component, in step 170. The Otsu algorithm assumes the image includes two different classes of pixels—one is an object (foreground pixels) and the other is the background (background pixels). It then searches for the optimum threshold using an averaging method to separate the object from the background, at step 170. A sub binary image, in FIG. 2D, is shown. A sub binary image is a partially binarized image (please see definition of binary image above). In the sub binary image, only the character components are binarized from the blob/connected component, which is a candidate for a logo. And in FIG. 2E, a binary image is shown, wherein the threshold value is applied to the other region in the image as a final threshold.

In step 180, a template of the predetermined image, namely the logo, is normalized according to the size of the components and connected components. Depending on the size of the components and connected components, the template may be shrunk or enlarged, so that a match may be found with greater accuracy. Further, template matching is a vision technique in digital image processing that identified objects inside the image that match a predefined trained template. An advanced template matching algorithm has the capability to find occurrences of the template regardless of its orientation, brightness or illumination, scaling as well as deformation. The template matching algorithm is based on a 2D image convolution. T(x,y) is a Logo Template image. It denotes each pixel coordinate (x,y) intensity. Assuming that S(x,y) is the search image, then the size of S(x,y) is bigger than T(x,y).

And in step 190, the normalized template is matched to the predetermined image that was being searched for, within the components and connected components. Further details of the process are discussed herein below.

Figure 4:
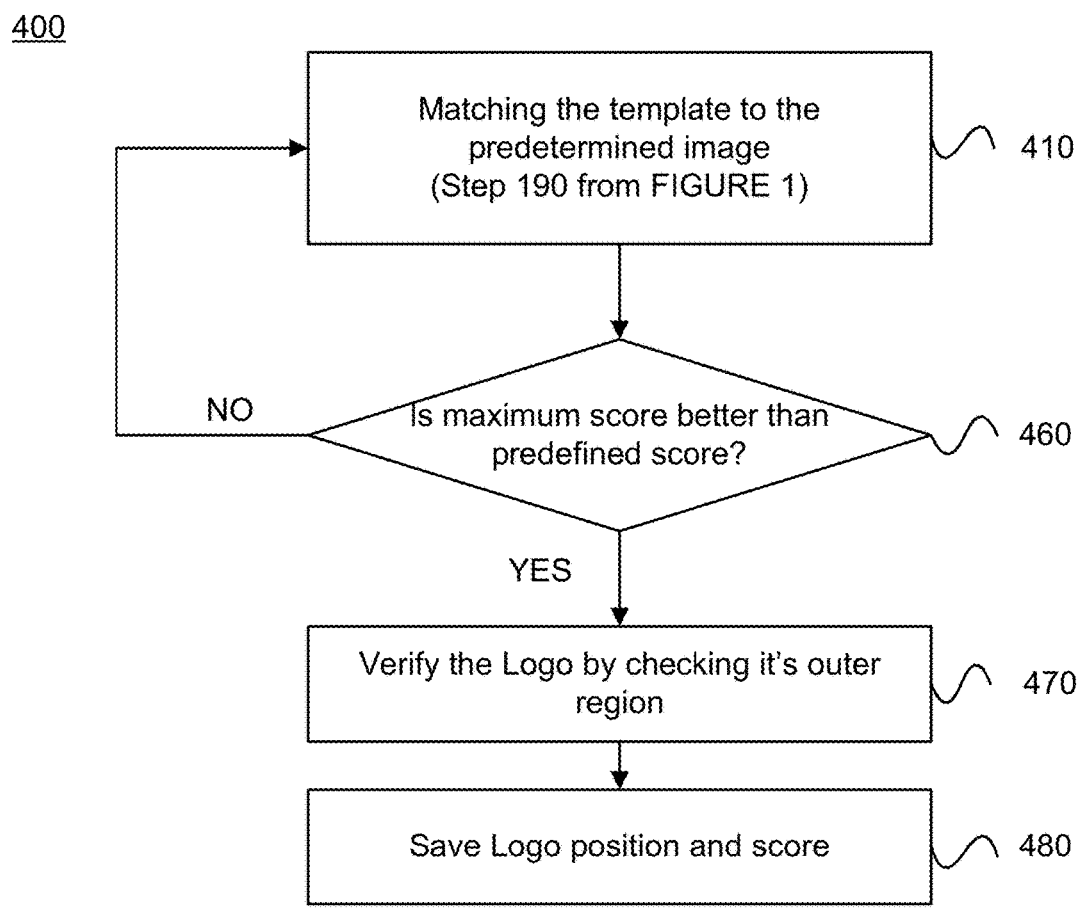
FIG. 4 illustrates another flow diagram of a process of finding a predetermined image, namely a logo or a brand.

Turning now to FIG. 4, the process 400 of logo detection further details the process 100 and continues from step 190 of FIG. 1. In step 410, the template is matched to the predetermined image, as in step 190 of FIG. 1.

Figure 5A:
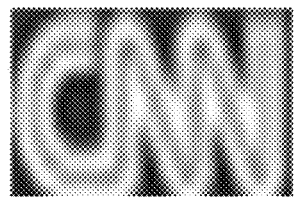
FIGS. 5A-5C illustrate a sample template image and a sample predetermined image, namely a logo or a brand.
Figure 5B:
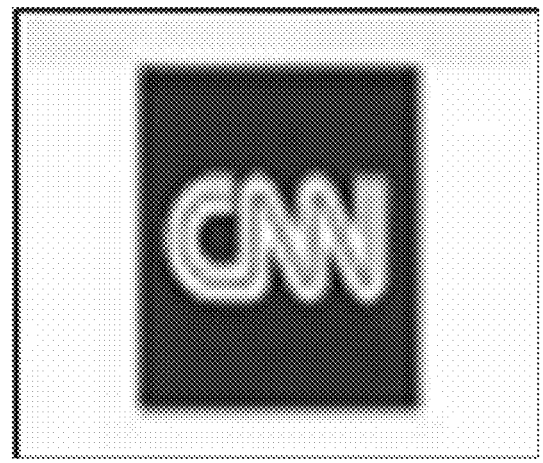
Figure 5C:
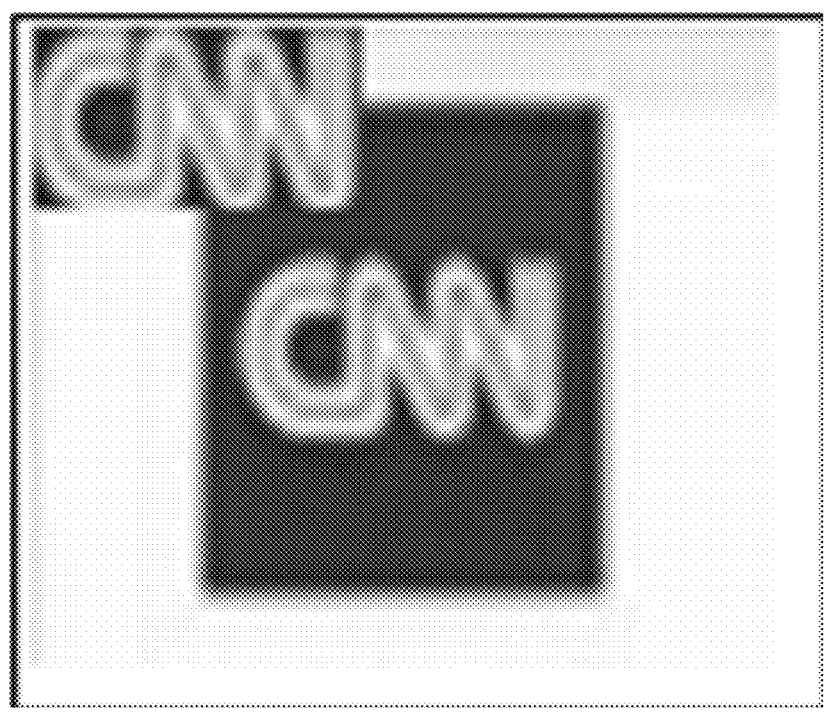

Once the size of the template and size of the components, or blobs, are similar, the template will be matched to the predetermined image, or logo. For purposes of this discussion, the term logo will be used for the image that is being searched for within the video and/or frame. An accuracy score, at step 460, is computed using an algorithm that detects a probability of a match between the template and the logo found within the video and/or frame. The Algorithm is based on 2D image convolution and will be further discussed below with reference to FIGS. 5A-5 C. Assume T(x, y) is a Logo Template image, as shown in FIG. 5A. It denotes each pixel coordinate (x, y) intensity. Assume S(x, y) is a search image, as shown in FIG. 5B. The size of S(x, y) should be bigger than T(x, y). By sliding, the template logo, FIG. 5A is moved one pixel every time (from top to bottom, and left to right), as shown in FIG. 5C. For each instance, one matching score between template logo image and search image is obtained by convolution.

After sliding is complete, a logo position with a maximum score is obtained as follows:

1. Get relative images

Get template image average intensity $AT=\Sigma T(x,y)/(w_t * h_t)$, where $w_t$, $h_t$ are the Template image width and height respectively.

Get search image average intensity $AS=\Sigma S(x, y)/(w_s * h_s)$ where $w_s$, $h_s$ are the search image width and height respectively.

Get relative Template image and search image to their average intensity $$T'(x,y)=T(x,y)-AT, \ S'(x,y)=S(x,y)-AS$$

2. Do convolution and get score results $$R(x,y)=\Sigma_{x',y'}(T'(x',y') \cdot S(x+x',y+y'))$$

3. To get the matching score between −1 to 1, we normalize the result R(x, y).

$$R'(x, y) = \frac{R(x, y)}{\sqrt{\sum_{x',y'} T'(x', y') \cdot \sum_{x',y'} S'(x', y')}}$$

4. Search the result R' (x, y) and get the maximum score.

If the score is not at a satisfactory predetermined level (predefined threshold value), then the process returns to step 410 to search for another suitable logo candidate. If the score is at a satisfactory number, then the logo is verified, at step 470. For verification purposes, the outer region of the logo is essentially traced to determine the validity of the logo found. A time stamp may also be placed in association with the logo. The time stamp provides information such as the length of time that the logo was on screen, where the logo was on the frame, how long the logo appeared in the stream, amongst others. At step 480, the position of the logo and the accuracy score from step 460, are saved in association with the logo. Each brand or logo is unique by itself. In order to catch the attention of an onlooker, advertisers often present the logo in a video or digital frame with a clear space surrounding itself. In order to achieve high accuracy of logo identification, robustness, refinement and verification of the logo candidate is done. In doing so, checking of the clear space from the outer region of each logo candidate is performed based on predefined parameters.

FIG. 6 depicts an apparatus, in association with the processes of FIGS. 1 and 4. In FIG. 6, a digital video 610 is sent to an apparatus. The digital video 610 may be sent, transferred, uploaded, streamed or transferred in any other manner. The server flash memory 620 obtains the digital video 610. The digital video 610 is moved from the source file through the server flash memory 620 in the CPU processor 630 directly for analytics processing. The digital video 610 is split into frame layers 640. The multiple frame layers allow the digital video 610 to be processed before the processor 630 pixelates the digital video 610 for display. Information is compared amongst what it is searching for against the layers 640 in the frame. The comparison processor 650 completes the comparison process and sends the results to be pixelated for viewing. The video card 660 pixelates the video for showing on a screen or any viewing medium.

Figure 7:
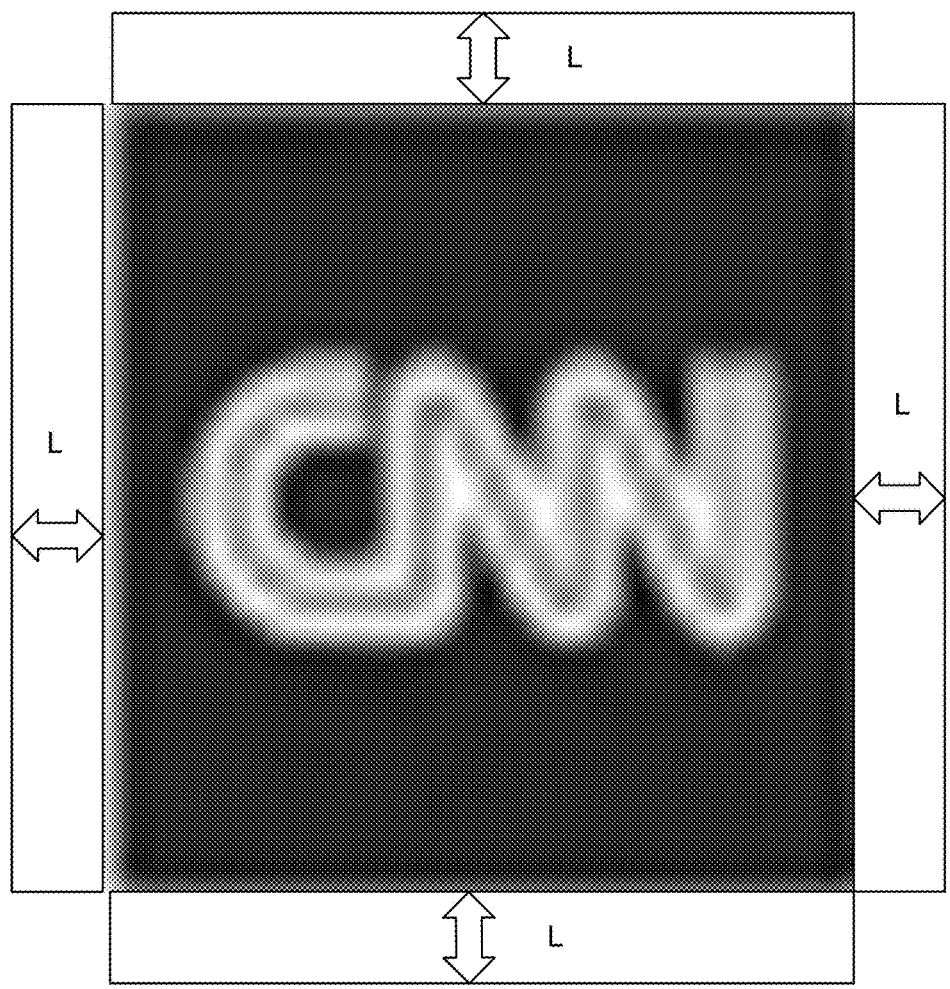
FIG. 7 illustrates a clear space area around a sample image.

Turning to FIG. 7, clear space surrounding the CNN Logo can be seen. L=Logo height * d/100, where the value of d can be set. The clear space is helpful in finalizing a matching logo, because the logo can be traced around the outer edge for verification of a match.

To increase capability and scalability of the logo detection algorithm, the logo detection could use a trainable methodology. Further, multithreading in the algorithm could improve time processing. Moreover, an algorithm could be added that could compute and detect logos with an extreme rotational logo candidate. Also, an algorithm could be added that could handle a deformed logo candidate. And also, an ability to track a confirmed logo candidate could also improve the capability of a logo detection algorithm.

Figure 8:
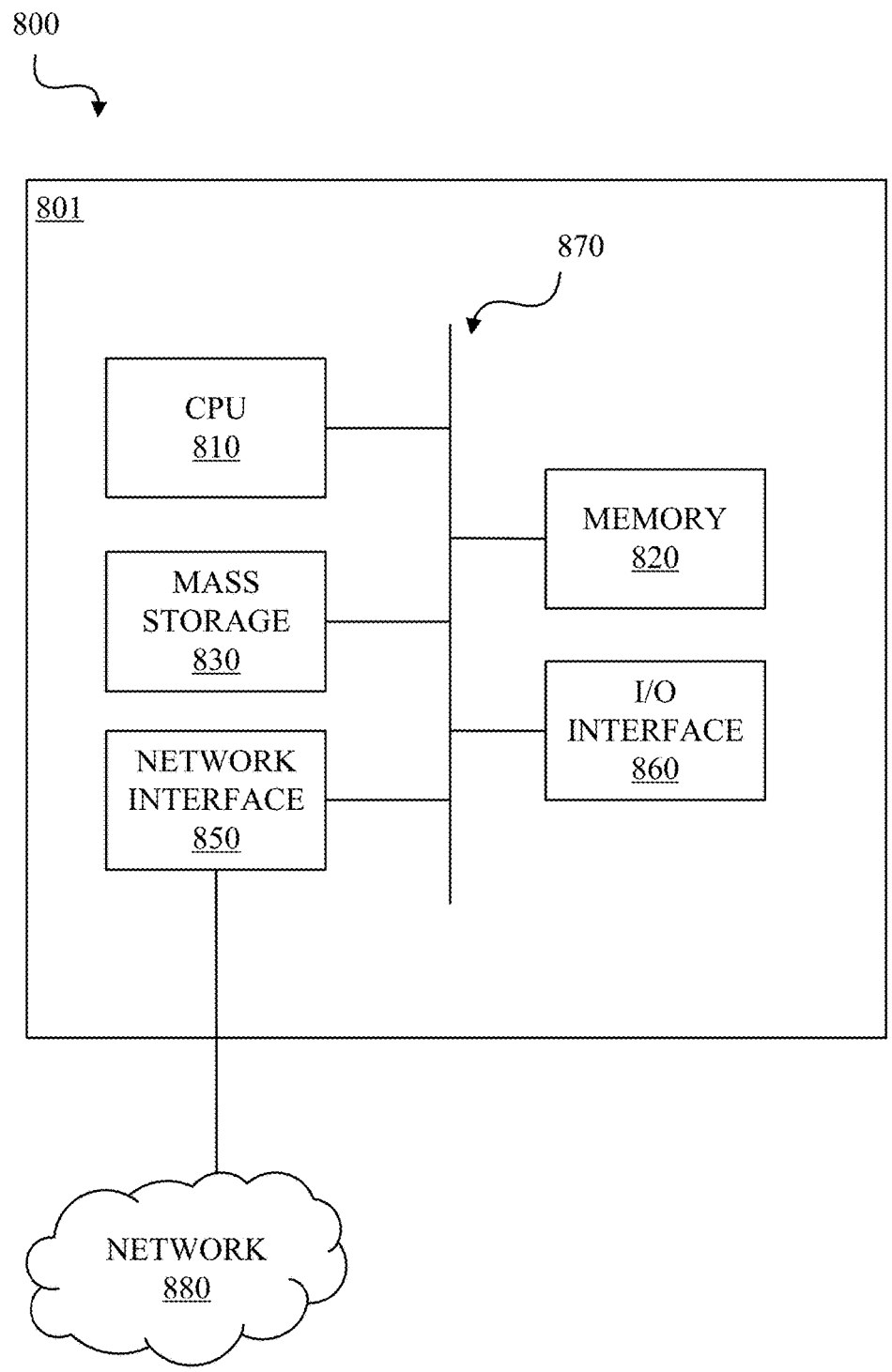
FIG. 8 illustrates a block diagram of a network system that can be used to implement various embodiments of a process of finding a predetermined image, namely a logo or a brand.

FIG. 8 is a block diagram of a network system that can be used to implement various embodiments. Specific devices may utilize all of the components shown, or only a subset of the components, and levels of integration may vary from device to device. Furthermore, a device may contain multiple instances of a component, such as multiple processing units, processors, memories, transmitters, receivers, etc. The network system may comprise a processing unit 801 equipped with one or more input/output devices, such as network interfaces, storage interfaces, and the like. The processing unit 801 may include a central processing unit (CPU) 810, a memory 820, a mass storage device 830, and an I/O interface 860 connected to a bus. The bus may be one or more of any type of several bus architectures including a memory bus or memory controller, a peripheral bus or the like.

The CPU 810 may comprise any type of electronic data processor. The memory 820 may comprise any type of system memory such as static random access memory (SRAM), dynamic random access memory (DRAM), synchronous DRAM (SDRAM), read-only memory (ROM), a combination thereof, or the like. In an embodiment, the memory 820 may include ROM for use at boot-up, and DRAM for program and data storage for use while executing programs. In embodiments, the memory 820 is non-transitory. The mass storage device 830 may comprise any type of storage device configured to store data, programs, and other information and to make the data, programs, and other information accessible via the bus. The mass storage device 830 may comprise, for example, one or more of a solid state drive, hard disk drive, a magnetic disk drive, an optical disk drive, or the like.

The processing unit 801 also includes one or more network interfaces 850, which may comprise wired links, such as an Ethernet cable or the like, and/or wireless links to access nodes or one or more networks 880. The network interface 850 allows the processing unit 801 to communicate with remote units via the networks 880. For example, the network interface 850 may provide wireless communication via one or more transmitters/transmit antennas and one or more receivers/receive antennas. In an embodiment, the processing unit 801 is coupled to a local-area network or a wide-area network for data processing and communications with remote devices, such as other processing units, the Internet, remote storage facilities, or the like.

In accordance with various embodiments of the present technology, the methods described herein may be implemented using a hardware computer system that executes software programs. Further, in an exemplary, non-limited embodiment, implementations can include distributed processing, component/object distributed processing, and parallel processing. Virtual computer system processing can be constructed to implement one or more of the methods or functionalities as described herein, and a processor described herein may be used to support a virtual processing environment.

Aspects of the present technology are described herein with reference to flowchart illustrations and/or block diagrams of methods, apparatuses (systems) and computer program products according to embodiments of the technology. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable instruction execution apparatus, create a mechanism for implementing the functions/acts specified in the flowchart and/or block diagram block or blocks.

The terminology used herein is for the purpose of describing particular aspects only and is not intended to be limiting of the technology. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The description of the present technology has been presented for purposes of illustration and description, but is not intended to be exhaustive or limited to the technology in the form disclosed. Many modifications and variations will be apparent to those of ordinary skill in the art without departing from the scope and spirit of the technology. The aspects of the technology herein were chosen and described in order to best explain the principles of the technology and the practical application, and to enable others of ordinary skill in the art to understand the technology with various modifications as are suited to the particular use contemplated.

For purposes of this document, each process associated with the disclosed technology may be performed continuously and by one or more computing devices. Each step in a process may be performed by the same or different computing devices as those used in other steps, and each step need not necessarily be performed by a single computing device.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. A method for detecting a predetermined image within a plurality of images using a template of the predetermined image, the method comprising:
    detecting color of the plurality of images;
    reducing the color of the plurality of images to a range of the color;
    converting the range of color of the plurality of images to a grayscale plurality of images;
    extracting at least one edge of the grayscale plurality of images;
    identifying each component in the grayscale plurality of images;
    conducting binarization for the each component;
    obtaining a threshold value for the each component;
    normalizing the template according to a size of the each component; and
    matching the template to the predetermined image using the at least one component in the plurality of images.

2. The method of claim 1, wherein the each component is a blob containing at least a portion of the predetermined image.

3. The method of claim 1, further comprising:
    determining whether the predetermined image is text based.

4. The method of claim 1, further comprising:
    filtering out at least a portion of the at least one component.

5. The method of claim 1, further comprising:
    calculating an accuracy value between the template and the predetermined image.

6. The method of claim 1, wherein the predetermined image found within the plurality of images is verified by virtually tracing an outline of the predetermined image.

7. The method of claim 1, wherein the plurality of images includes, but is not limited to, (a) a single frame, (b) a still image, (c) a video, (d) a television program, (e) an internet stream, (f) a media production, and (g) multiple screen shots.

8. The method of claim 1, further comprising:
    splitting the plurality of images into layers.

9. The method of claim 8, wherein the layers are separated into high quality images and low quality images.

10. The method of claim 1, wherein a time stamp is associated with the predetermined image found within the plurality of images.

11. The method of claim 10, wherein the time stamp includes time when the predetermined image appears, when the predetermined image disappears from the plurality of images and a length of time that the predetermined image appears.

12. An apparatus detecting a predetermined image within a plurality of images using a template of the predetermined image, comprising:
    a processor and a memory; and
    an agent, executable by the processor, configured to:
        determine whether the predetermined image is a text based image;
        detect color of the plurality of images;
        reduce the color of the plurality of images to a range of color;
        convert the range of color of the plurality of images to a grayscale plurality of images;
        extract at least one edge of the grayscale plurality of images;
        identify each component in the grayscale plurality of images;
        conduct binarization for the each component;
        obtain a threshold value for the each component;
        normalize the template according to a size of the each component; and
        match the template to the predetermined image using the at least one component in the plurality of images.

13. The apparatus according to claim 12, wherein the each component is a blob containing at least a portion of the predetermined image.

14. The apparatus of claim 12, wherein the agent is further configured to:
    calculate an accuracy value between the template and the predetermined image.

15. The apparatus of claim 12, wherein a time stamp is associated with the predetermined image found within the plurality of images.

16. A computer storage device comprising one or more processors and a memory having collectively stored therein instructions that, when executed by the processor, cause the processor to:
    determine whether the predetermined image is a text based image;
    detect color of the plurality of images;
    reduce the color of the plurality of images to a range of color;
    convert the range of color of the plurality of images to a grayscale plurality of images;
    extract at least one edge of the grayscale plurality of images;
    identify each component in the grayscale plurality of images;
    conduct binarization for the each connected component;
    obtain a threshold value for the each component;
    normalize the template according to a size of the each component; and
    match the template to the predetermined image using the at least one component in the plurality of images.

17. The computer storage device of claim 16, wherein the each component is a blob containing at least a portion of the predetermined image.

18. The computer storage device of claim 16, wherein the agent is further configured to:
    calculate an accuracy value between the template and the predetermined image.

19. The computer storage device of claim 16, wherein a time stamp is associated with the predetermined image found within the plurality of images.

20. The computer storage device of claim 19, wherein the time stamp includes time when the predetermined image appears, when the predetermined image disappears from the plurality of images, and a length of time that the predetermined image appears.

* * * * *